(No Model.)
L. LAFAYETTE.
PICK FOR MILL AND OTHER STONES.
No. 256,905. Patented Apr. 25, 1882.
Fig: 1.
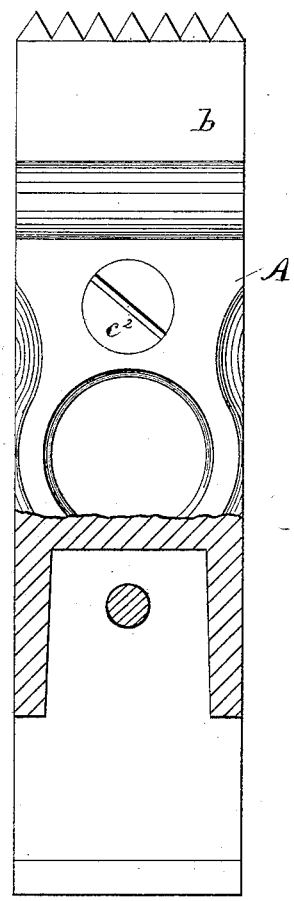
Fig: 2.
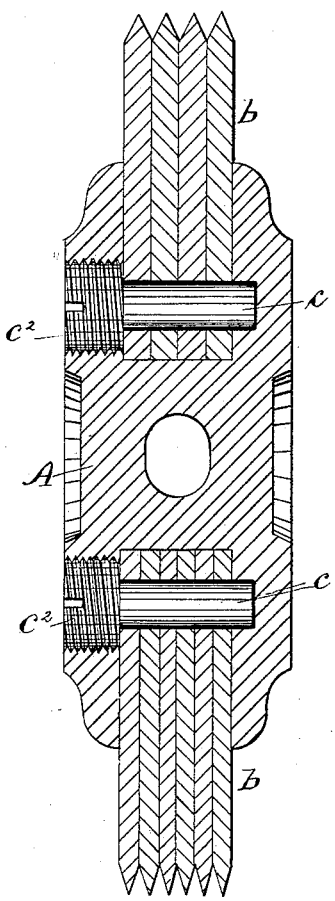
Fig: 3.
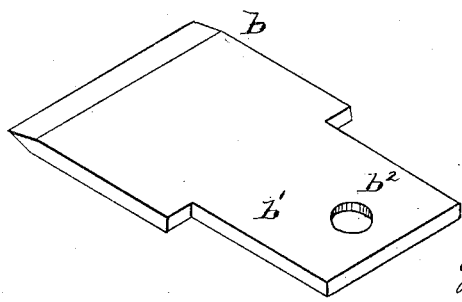

UNITED STATES PATENT OFFICE.

LAWRENCE LAFAYETTE, OF SUNCOOK, NEW HAMPSHIRE.

PICK FOR MILL AND OTHER STONES.

SPECIFICATION forming part of Letters Patent No. 256,905, dated April 25, 1882.

Application filed November 16, 1881. (No model.)

*To all whom it may concern:*

Be it known that I, LAWRENCE LAFAYETTE, of Suncook, county of Merrimack, State of New Hampshire, have invented an Improvement in Picks for Mill and other Stones, of which the following description, in connection with the accompanying drawings, is a specification.

In picks for dressing or facing mill or other stones as heretofore constructed the blades placed between plates connected with the stock which receives the handle have usually been confined in position by two bolts the heads of which have projected beyond the stock, the two bolts being necessary to prevent the blades from twisting. In this my improved pick the shanks or tangs of the blades are entered and fitted into a rectangular recess at the end of the stock or blade-holder, and are confined therein by means of a single pin the head of which is screw-threaded to engage threads made in one side of the stock to thus keep the pin in place. The under side of the head of the pin is made to bear upon the shank of the blade next to it, and by turning the pin the shanks of all the blades may be pressed closely together, thus producing between them very considerable friction, which also helps to hold the blades snugly in the stock.

Figure 1 represents in side elevation one of my improved mill-picks, the stock being broken out to show the shank of one of the blades fitted therein. Fig. 2 is a longitudinal section of one of my improved picks, and Fig. 3 is a detail of one of the blades.

The head A, of metal, has at each end a rectangular or other proper shaped recess of suitable depth and width to receive and inclose on all sides the shanks of two or more blades, $b$, of usual construction. The drawings show four blades secured at one end of the stock and six blades at its other end. The shank $b'$ of the blade closely fills the recess in the head A, and preferably the said recess is made to taper a little outward, it being a little larger at its mouth, as in Fig. 1, than at its bottom to receive the correspondingly-tapered shanks $b'$ of the blades $b$. The shanks of the blades have holes $b^2$ to receive the pin $c$, the enlarged head $c^2$ of which is screw-threaded, and which is screwed flush into the stock A, as shown in Fig. 2. The under side of the head $c^2$ presses on the shank of the blade next under it, and may be turned in more or less to produce more or less pressure or friction of one shank against the other and prevent any twisting or sliding of the shanks with relation to each other.

A pick constructed, as shown, with but one pin is cheaper than the old form known to me, the blades may be more readily changed when desired, and there are no projecting bolt heads or ends or nuts.

I claim—

As an improved article of manufacture, a pick composed of a stock provided with recesses to receive and inclose the shanks of the blades on all sides, of a series of blades, $b$, having their shanks fitted into the said recesses in the stock, and of a single pin for each series of blades, the said pins being extended through the said blades and screwed into the stock, substantially as described.

In testimony whereof I have signed my name to this specification before two subscribing witnesses.

LAWRENCE LAFAYETTE.

Witnesses:
 WM. H. APPLETON,
 SAMUEL APPLETON.